(No Model.)
J. JUVENET.
MACHINE FOR REMOVING THE FIBER FROM JUTE, &c.
No. 352,977. Patented Nov. 23, 1886.
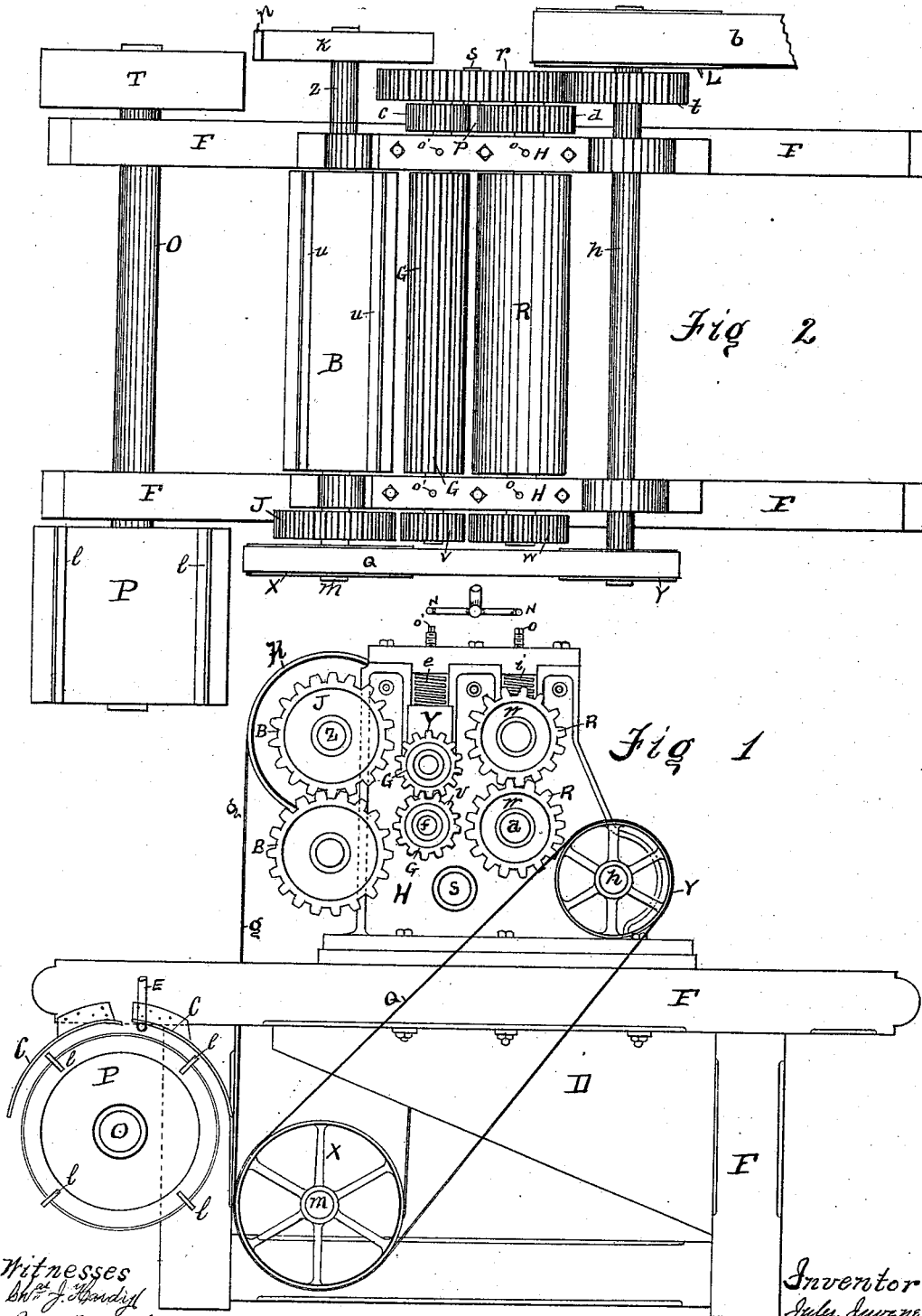

UNITED STATES PATENT OFFICE.

JULES JUVENET, OF NEW ORLEANS, LOUISIANA.

MACHINE FOR REMOVING THE FIBER FROM JUTE, &c.

SPECIFICATION forming part of Letters Patent No. 352,977, dated November 23, 1886

Application filed January 5, 1886. Serial No. 187,665. (No model.)

*To all whom it may concern:*

Be it known that I, JULES JUVENET, a citizen of France, and a resident of the city of New Orleans, in the parish of Orleans and State of Louisiana, have invented a new and useful Machine for Removing the Fiber from Jute, Ramie, or other Fibrous Plants, of which the following is a specification.

My invention relates to improvements in a machine for removing the fiber from jute, ramie, and other fibrous plants in which fluted or grooved rollers work in combination with a set of smooth rollers and with beaters; and the objects of my invention are: first, to remove the fiber from jute, ramie, or other fibrous plants without injuring the fiber, as also to do the work in an expeditious manner; second, to provide a means by which the fiber can be combed and freed of all small particles of the woody portion of the plant. I attain these objects by the mechanism illustrated in the accompanying drawings, in which—

Figure 1 is a side elevation of my machine, and Fig. 2 a plan view of same.

Similar letters refer to similar parts throughout the several views.

To a suitable frame, F, is bolted a housing, H. This housing H carries and supports the journals of shafts of the smooth receiving and feeding rollers R R, the fluted or grooved crushing-rollers G G, and the roughing-beaters B B, placed in position one behind the other in the order named, as shown on the plan.

Motion is transmitted to the smooth receiving and feeding rollers R R and to the fluted or grooved crushing-rollers G G by the pinion $p$, placed on shaft $s$, and working into the pinion $d$, placed on shaft $a$ of the lower smooth roller R, and pinion $c$, placed on shaft $f$ of the lower fluted or grooved crushing-roller G, as shown, the upper smooth receiving and feeding roller R being driven by the crown-wheels W, and the upper fluted or grooved crushing-roller G being driven by the crown-wheels V, as shown.

Motion is imparted to the shaft $s$ by the pinion $t$, placed on shaft $h$, working into spur $r$, secured to shaft $s$, as shown, the shaft $h$ being driven from counter-shaft by bell $b$, working on the pulley L, secured to shaft $h$, as shown. The top roughing-beater is driven by the belt $g$, working on the pulley $n$, placed on shaft M, and on the pulley K, placed on the shaft $z$ of the top beater, as shown. The bottom roughing-beater, B, is driven by the crown-wheels J.

Motion is imparted to the shaft M by the belt Q, working on pulley Y, secured to shaft $h$, and on the pulley X, placed on shaft M, as shown. The finishing-beater P is secured to a shaft, O, which shaft works in journal-boxes secured to uprights of frame F, as shown. Motion is imparted to this shaft O by a belt from counter-shaft working on pulley T, secured to shaft O, as shown.

The smooth receiving and feeding rollers R are turned perfectly smooth and true, and are made to make about fifty revolutions per minute. These rollers receive the stalks and feed same to the fluted or grooved crushing-rollers G evenly. The tension or resistance of these rollers R can be regulated by the spring $i$ and set-screw $o$. The fluted or grooved crushing-rollers G are fluted, as shown, so that the woody portion of the stalk passing through same is broken in short pieces. The teeth of these fluted rollers are about three-fourths of an inch deep, and the bottom and top of teeth are rounded off, and the rollers are so set that the tooth of one of the rollers $f$ works into the groove of the other roller. The rollers G are also provided with a spring, $e$, and set-screw $o'$, as shown, to admit of the regulating of same to any pressure desired. These rollers G are driven at about fifty revolutions per minute.

The roughing-beaters B consist of four iron blades, $u$, secured to a suitable drum, these blades $u$ being placed on edge, and extend the whole length of drum, as shown. These roughing-beaters B receive the stalk after same has been broken in pieces in passing through the fluted or grooved crushing-rollers G, and knocks out the larger portion of the broken woody substance of the stalk. These beaters B are driven at about one hundred and twenty-five revolutions per minute.

The short finishing-beater P consists of four iron blades, $l$, placed on edge, and secured to a suitable drum, similar to the roughing-beaters B. The finishing-beater P is provided with a sheet-metal covering, C, to protect the operator. A spray of water from the pipe E is allowed to play on this finishing-beater P, to keep the fiber from adhering to it. The object of this finishing-beater P is to comb out any small pieces of woody matter which may not have been dislodged in passing through the roughing-beaters B. This finishing-beater P is made to make about four hundred revolutions per minute. As the stalks pass through the smooth receiving and feeding rollers R and the fluted or grooved rollers G they receive a spray of water from the pipes N N, which pipes extend the length of rollers, and are perforated with small holes.

D is a tank, placed between the frames F, and under the machine, to collect all the débris falling from the machine.

Having thus described the construction of my improved machinery for removing the fiber from jute, ramie, or other fibrous plants, the operation of same is as follows: The stalk or plants are fed to the receiving and feeding rollers R, which are set to squeeze them sufficiently to spread the stalks and feed same evenly to the grooved or fluted rollers G, which are set so that the woody portion of the stalk is broken in small pieces without cutting or breaking the fiber of stalk. The water which is allowed to flow on the rollers R and G from pipe N keeps the fiber from adhering to the rollers. After the stalks are broken in passing through the fluted or grooved rollers G they pass between the roughing-beaters B, which knocks out the greater portion of the woody substance of stalks, and the débris falls into the tank D. As the fiber leaves the roughing-beaters B it is grasped by the operator, who takes the fiber and holds it onto the finishing-beater P, where all the small particles of woody matter which were not taken out by the roughing-beaters B are combed out, leaving the fiber freed of all the woody portions of stalk and ready for the chemical bath, in which the outer cuticle and all vegetable and gummy matter are removed. After the bath the fiber is thoroughly rinsed in clean running water, when it is ready for the loom.

I am aware that heretofore machines have been used for decorticating in which crushing-rolls and beaters were employed; but my machine is distinguished from such machines in that I combine with the feed-rollers, crushing-rollers, and revolving beaters a supplemental finishing-beater cylinder arranged adjacent to the main revolving beaters, so that after the fibrous plants have been passed through the machine proper the fiber product may be fed by hand to the supplemental beaters to thoroughly clear it of woody matter.

Having thus described the construction and operation of my machine for removing the fiber from jute, ramie, and other fibrous plants, I claim as new and desire to secure by Letters Patent—

1. The combination, with smooth feed-rollers, grooved crushing-rollers, and revolving beaters, of a supplemental finishing-cylinder provided with radial beaters, said supplemental cylinder being arranged with relation to the main rollers substantially as described, so that the material being treated may be fed by hand to said supplemental beaters after passing through the main rollers, substantially as described.

2. The combination, with a series of feed-rollers, crushing-rollers, and main beaters, of a supplemental beater, to whose action the fiber is subjected after being grasped by the hand of the operator from the main beaters, substantially as described.

3. The combination, with the tank D and housing H, of the feed-rollers, crushing-rollers, and main beaters, all arranged, as described, above said tank, and provided with spray-pipes and an independent revolving finishing-beater, against which the fiber is held by hand after it passes from the main beaters, and a spray-pipe, E, substantially as described.

J. JUVENET.

Witnesses:
WALTER TURNBULL,
L. W. BROWN.